(12) United States Patent
Lutter et al.

(10) Patent No.: US 6,657,407 B2
(45) Date of Patent: Dec. 2, 2003

(54) METHOD FOR DETERMINING THE ROTATIONAL POSITION OF THE DRIVE SHAFT OF A DIRECT CURRENT MOTOR

(75) Inventors: Thomas Lutter, Hoeingen (DE); Stefan Otte, Witten (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/307,739

(22) Filed: Dec. 2, 2002

(65) Prior Publication Data

US 2003/0102831 A1 Jun. 5, 2003

Related U.S. Application Data

(63) Continuation of application No. PCT/EP01/06218, filed on Jun. 1, 2001.

(30) Foreign Application Priority Data

Jun. 6, 2000 (DE) .......................... 100 28 037

(51) Int. Cl.$^7$ ................................. H02P 1/22
(52) U.S. Cl. ...................... 318/286; 318/254; 318/430; 318/466
(58) Field of Search ................ 318/254, 286, 318/430, 466, 467

(56) References Cited

U.S. PATENT DOCUMENTS

| 4,870,333 A | * | 9/1989 | Itoh et al. | 318/286 |
| 5,877,955 A | * | 3/1999 | Struyk | 700/69 |
| 5,903,128 A | * | 5/1999 | Sakakibara et al. | 318/721 |

* cited by examiner

Primary Examiner—Rita Leykin
(74) Attorney, Agent, or Firm—Brooks Kushman P.C.

(57) ABSTRACT

A method for determining the position of a movable element driven by a motor shaft includes using a counter to count current ripples contained in an armature current signal of the motor as the motor shaft rotates to drive the element. The position of the element is determined based on the counted current ripples. Upon power to the motor being interrupted such that the motor shaft slows down during the power interruption and upon the counter being prevented from counting the current ripples contained in the armature current signal of the motor during the slowdown of the motor shaft, an amount of current ripples expected to be contained in the armature current signal of the motor during the slowdown of the motor shaft is estimated. The position of the element during the slowdown of the motor shaft is determined based on the estimated amount of current ripples.

15 Claims, No Drawings

METHOD FOR DETERMINING THE ROTATIONAL POSITION OF THE DRIVE SHAFT OF A DIRECT CURRENT MOTOR

CROSS-REFERENCE TO RELATED APPLICATIONS

This is a continuation of International Application PCT/EP01/06218, published in German, with an international filing date of Jun. 1, 2001.

BACKGROUND OF THE INVENTION

1. Field of the Invention

The invention relates to a method for determining the rotational position of the drive shaft of a direct current (DC) motor by evaluating the current ripple contained in the armature current signal of the DC motor.

2. Background Art

The armature current signal of a direct current (DC) motor includes a so-called direct component and a ripple component superimposed on the direct component. The ripple component arises when the DC motor is operated as a consequence of the interaction of the magnetic field, the armature winding, and the commutator of the DC motor. This expresses itself in a short-term change in the induced voltage, which produces the ripple content of the armature current signal. The current peaks contained in the armature current signal (referred to below as "current ripple") occur when the armature rotates, and have a frequency corresponding to the number of collector bars.

For example, if the armature has ten collector bars, the armature current signal accordingly has ten current ripples that can be identified in it. Thus, counting the current ripples can give information about the current rotational position of the armature of the DC motor and thus also regarding an element driven by it within a predetermined segment of travel. To accomplish this the analog armature current signal is digitized to be able to perform a corresponding counting.

Such processes are used, for example in the area of motor vehicles to control adjustment drives, such as are provided for power windows and/or sunroofs, for example. An essential element in capturing the position of the window glass, for example, is the position at which the pinching protection can be turned off when the window is closed. The pinching protection has to be turned off so that the window glass can go completely in its top block and into the weather strip provided there without the motor being turned off as a result of the increased load. If the counting of the current ripples to determine the position of the window glass is incorrect, it can happen that the pinching protection is turned off too early or too late.

Some electrical window raising devices with such position capture have thermal switches arranged in electrical connection between the DC motor and the evaluation electronics or the voltage source. This is intended to prevent overheating of the DC motor, perhaps in the case it is erroneously triggered, and to reduce the dangers arising from such heating. If the thermal switch is tripped, any electrical connection between the DC motor and the evaluation electronics is interrupted. Tripping the thermal switch has the consequence that the supply of power to the DC is immediately interrupted.

Nevertheless, the DC motor will still coast for a certain time and not immediately come to a stop. This means that the armature of the DC motor and, accordingly, also the window moved by it, actually still move a certain distance farther. However, capturing the position by way of detecting current ripples to take account of this coasting in the position determination is not possible due to the interrupted electrical connection between the DC motor and the evaluation electronics.

SUMMARY OF THE INVENTION

Therefore, starting from the prior art which has been discussed, the invention is based on the task of further developing the type of process mentioned at the beginning in such a way that, even if there is a sudden interruption in the electrical connection between the direct current (DC) motor and the evaluation electronics, it is possible to determine the position of the electric motor's armature with sufficient accuracy.

This task is solved according to the invention by the fact that if the electrical connection between the DC motor and the evaluation electronics is interrupted, the rotational angle covered during the slowdown of the armature of the DC motor is approximated by determining the number of current ripples expected during this slowdown.

DETAILED DESCRIPTION OF THE PREFERRED EMBODIMENT(S)

The process according to the invention is characterized by the fact that if the electrical connection between the direct current (DC) motor and the evaluation electronics is interrupted, the number of current ripples, which should be expected when there is such a motor slowdown, is approximated (estimated). It is expedient for this approximation to make use of the parameters which characterized the operation of the DC motor before it was turned off. Parameters which can be used in the approximation are the period of a reference current ripple and/or the armature current, for example. To reduce the calculation effort, certain simplifications can be made, perhaps assuming that the rotational speed of the DC motor's armature decreases in a linear manner until it stops.

The distance covered by the armature of the DC motor when it is turned off, and especially also when such a thermal switch is tripped, can be described by the equation reproduced below, where the motor drive torque is θ:

$$2\pi J \partial n/\partial t + M_{load} = 0$$

where J is the DC motor's moment of inertia, n is its rotational speed, t is the time, and M is the load.

Assuming that the decrease in rotational speed is linear and that the load torque is equal to the most recent motor torque, which in turn is proportional to the armature current, the distance covered by the armature in the motor slowdown phase can be estimated on the basis of the most recently captured armature current data using the following equation:

$$\Delta n/\Delta t = -\text{constant} \cdot I_{armature}$$

$$\text{with } \Delta n/\Delta t = (n_0 - 0)/(0 - T)$$

$$\text{and } \gamma = {}^T\!\!\int_0 n \partial t = n \cdot T$$

$$\gamma = n^2{}_0/(I_{armature})$$

where T is the period of a reference current ripple and gamma (γ) is the angle of rotation covered by the armature, or with reference to the period of the most recently detected current ripple:

$$n = 1/(T_{mot})$$

$$\gamma = \text{constant}/(I_{armature} \cdot T^2_{mot})$$

The process according to the invention makes possible a sufficiently precise determination of the position of the armature and, accordingly, the position of an element driven by the DC motor, even if there is a sudden interruption in the electrical connection between the DC motor and the evaluation electronics and the voltage source, taking into consideration the rotational angle covered by the armature during the slowdown phase. The prior art required that the entire system be restandardized when such a sudden interruption occurred, so that the automatic window raising is turned off until such a restandardization has taken place. In principle this is no longer necessary when the object of the invention is used.

While embodiments of the invention have been described, it is not intended that these embodiments describe all possible forms of the invention. Rather, the words used in the specification are words of description rather than limitation, and it is understood that various changes may be made without departing from the spirit and scope of the invention.

What is claimed is:

1. A method for determining the position of a movable element driven along a travel segment by a shaft of a motor, the method comprising:

using a counter to count current ripples contained in an armature current signal of the motor as the motor shaft rotates to drive the movable element along the travel segment;

determining the position of the movable element along the travel segment based on the counted current ripples;

upon power to the motor being interrupted such that the motor shaft slows down during the power interruption and upon the counter being prevented from counting the current ripples contained in the armature current signal of the motor during the slowdown of the motor shaft, estimating an amount of current ripples expected to be contained in the armature current signal of the motor during the slowdown of the motor shaft; and determining the position of the movable element along the travel segment during the slowdown of drive shaft of the motor based on the estimated amount of current ripples.

2. The method of claim 1 wherein:

estimating the amount of current ripples expected to be contained in the armature current signal of the motor during the slowdown of the motor shaft includes taking into consideration a parameter of a counted current ripple.

3. The method of claim 1 wherein:

estimating the amount of current ripples expected to be contained in the armature current signal of the motor during the slowdown of the motor shaft includes taking into consideration a parameter of the power supplied to the motor prior to the power interruption.

4. The method of claim 1 wherein:

estimating the amount of current ripples expected to be contained in the armature current signal of the motor during the slowdown of the motor shaft includes taking into consideration an assumption that the slowdown of the motor shaft occurs over a linear function of time.

5. The method of claim 2 wherein:

the parameter of the counted current ripple is the period of the counted current ripple.

6. The method of claim 2 wherein:

the counted current ripple is the last current ripple counted by the counter prior to the counter being prevented from counting the current ripples.

7. A method for determining the position of a movable element driven along a travel segment by a shaft of a motor, the method comprising:

using a counter to count current ripples contained in an armature current signal of the motor as the motor shaft rotates to drive the movable element along the travel segment;

determining the position of the movable element along the travel segment based on the counted current ripples;

upon power to the motor being interrupted such that the motor shaft slows down during the power interruption and upon the counter being prevented from counting current ripples contained in the armature current signal of the motor during the slowdown of the motor shaft, estimating an amount of current ripples expected to be contained in the armature current signal of the motor during the slowdown of the motor shaft by taking into consideration the period of a counted current ripple; and determining the position of the movable element along the travel segment during the slowdown of the motor shaft based on the estimated amount of current ripples.

8. The method of claim 7 wherein:

the counted current ripple used in the step of estimating is the last current ripple counted by the counter prior to the counter being prevented from counting the current ripples.

9. The method of claim 7 wherein:

estimating the amount of current ripples expected to be contained in the armature current signal of the motor during the slowdown of the motor shaft includes taking into consideration a parameter of the power supplied to the motor prior to the power interruption.

10. The method of claim 7 wherein:

estimating the amount of current ripples expected to be contained in the armature current signal of the motor during the slowdown of the motor shaft includes taking into consideration an assumption that the slowdown of the motor shaft occurs over a linear function of time.

11. A method for determining the position of a movable element driven along a travel segment by a shaft of a motor, the method comprising:

using a counter to count current ripples contained in an armature current signal of the motor as the motor shaft rotates to drive the movable element along the travel segment;

determining the position of the movable element along the travel segment based on the counted current ripples;

upon power to the motor being interrupted such that the motor shaft slows down during the power interruption and upon the counter being prevented from counting the current ripples contained in the armature current signal of the motor during the slowdown of the motor shaft, estimating an amount of current ripples expected to be contained in the armature current signal of the motor during the slowdown of the motor shaft by taking into consideration a parameter of the armature current signal prior to the power interruption; and determining the position of the movable element along the travel segment during the slowdown of the motor shaft based on the estimated amount of current ripples.

12. The method of claim 11 wherein:

estimating the amount of current ripples expected to be contained in the armature current signal of the motor during the slowdown of the motor shaft includes taking into consideration a parameter of a counted current ripple.

13. The method of claim 12 wherein:

the parameter of the counted current ripple is the period of the counted current ripple.

14. The method of claim 12 wherein:

the counted current ripple is the last current ripple counted by the counter prior to the counter being prevented from counting current ripples.

15. The method of claim 12 wherein:

estimating the amount of current ripples expected to be contained in the armature current signal of the motor during the slowdown of the motor shaft includes taking into consideration as assumption that the slowdown of the motor shaft occurs over a linear function of time.

* * * * *

UNITED STATES PATENT AND TRADEMARK OFFICE
CERTIFICATE OF CORRECTION

PATENT NO. : 6,657,407 B2
DATED : December 2, 2003
INVENTOR(S) : Thomas Lutter

It is certified that error appears in the above-identified patent and that said Letters Patent is hereby corrected as shown below:

<u>Column 3,</u>
Line 46, delete "drive" and insert -- the --.

Signed and Sealed this

Sixth Day of April, 2004

JON W. DUDAS
*Acting Director of the United States Patent and Trademark Office*